(12) United States Patent
Miyajima

(10) Patent No.: US 10,704,999 B2
(45) Date of Patent: Jul. 7, 2020

(54) CONVEYOR BELT

(71) Applicant: THE YOKOHAMA RUBBER CO., LTD., Minato-Ku, Tokyo (JP)

(72) Inventor: Atsushi Miyajima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 16/500,660

(22) PCT Filed: Dec. 14, 2017

(86) PCT No.: PCT/JP2017/044870
§ 371 (c)(1),
(2) Date: Oct. 3, 2019

(87) PCT Pub. No.: WO2018/185977
PCT Pub. Date: Oct. 11, 2018

(65) Prior Publication Data
US 2020/0110011 A1    Apr. 9, 2020

(30) Foreign Application Priority Data

Apr. 5, 2017 (JP) ................................. 2017-074966

(51) Int. Cl.
| | |
|---|---|
| B65G 15/00 | (2006.01) |
| B65G 15/30 | (2006.01) |
| B65G 15/32 | (2006.01) |
| B65G 15/38 | (2006.01) |
| G01N 3/30 | (2006.01) |
| B65G 15/34 | (2006.01) |

(52) U.S. Cl.
CPC ............. *G01N 3/30* (2013.01); *B65G 15/34* (2013.01); *B65G 2812/02178* (2013.01)

(58) Field of Classification Search
None
See application file for complete search history.

(56) References Cited

U.S. PATENT DOCUMENTS

| 3,556,892 A | * | 1/1971 | Hillard, Jr. ............... B32B 27/00 |
| | | | 156/164 |
| 5,514,471 A | * | 5/1996 | Okano ........................ D01F 6/60 |
| | | | 428/364 |
| 2017/0240730 A1 | | 8/2017 | Matsumuro et al. |
| 2018/0100785 A1 | | 4/2018 | Hou et al. |

FOREIGN PATENT DOCUMENTS

| JP | 2008-224510 A | 9/2008 |
| JP | 2016-204159 A | 12/2016 |
| WO | 2016/056219 A1 | 4/2016 |

* cited by examiner

*Primary Examiner* — Kavel Singh
(74) *Attorney, Agent, or Firm* — Carrier Blackman & Associates, P.C.; William D. Blackman; Joseph P. Carrier

(57) ABSTRACT

A conveyor belt 10 is formed with a belt core body 14 covered by a cover rubber 12. The cover rubber 12 is formed with a shock resistance performance evaluation index, i.e., the product of an elongation at break Eb, a tensile strength at break TSb, and a loss tangent tan δ of 6000 or greater. The loss tangent tan δ is the ratio between a storage modulus and a loss modulus calculated from a stress when vibrations of a predetermined frequency are applied to cover rubber 12. The measurement conditions of the loss tangent tan δ are determined on the basis of a speed of an impact applied under the use conditions of the conveyor belt 10.

4 Claims, 4 Drawing Sheets

FIG. 1A
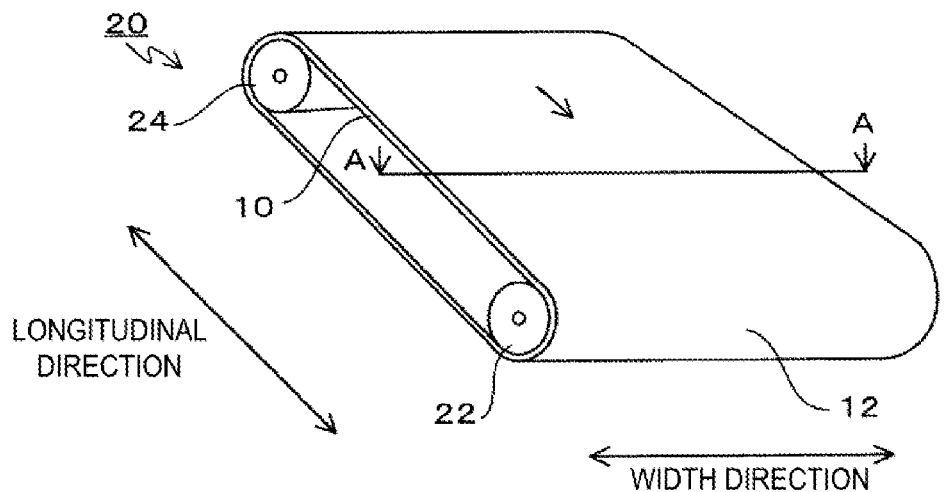
FIG. 1B
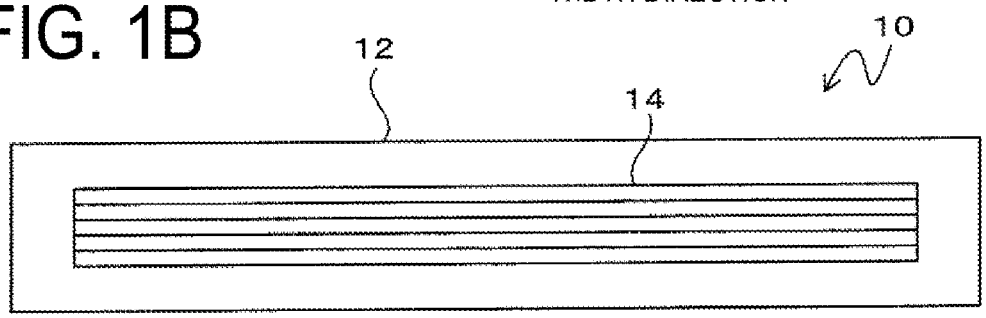
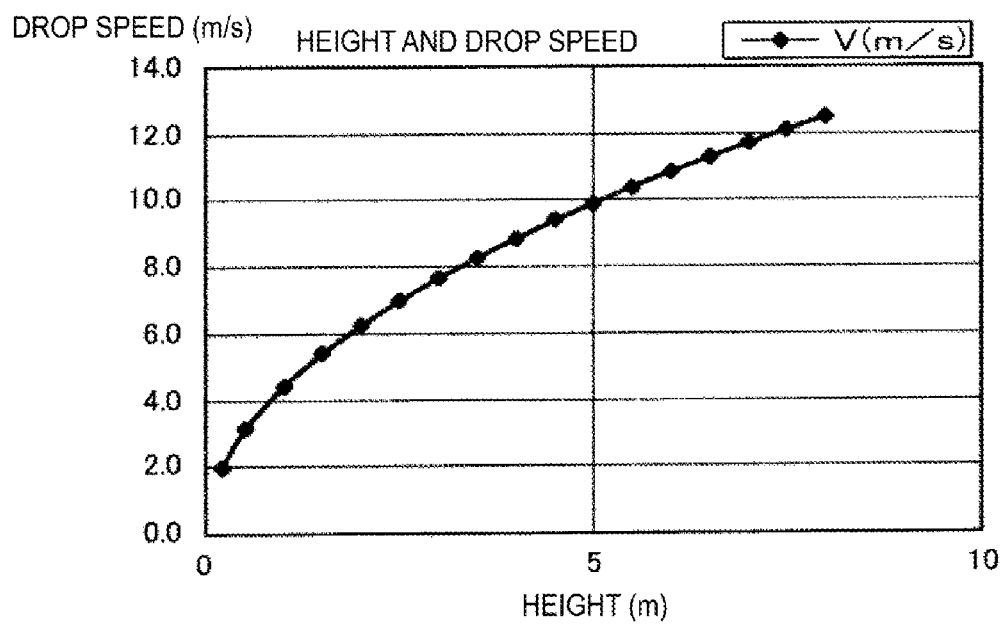
FIG. 2

| | | UNIT | SAMPLE A | SAMPLE B | SAMPLE C | REMARKS |
|---|---|---|---|---|---|---|
| PERFORMANCE EVALUATION VALUE | TENSILE STRENGTH AT BREAK | MPa | 22.3 | 28.2 | 20.9 | TSb |
| | ELONGATION AT BREAK | % | 572 | 562 | 530 | Eb |
| | BREAK ENERGY INDEX | | 12761 | 15848 | 11077 | Eb × TSb |
| | Eb × TSb × tan δ (10 kHz) | | 6543 | 5901 | 4944 | |
| TEST RESULTS | DROP IMPACT TEST | mm | 17.2 | 19.9 | - | NEEDLE ENTER DEPTH |
| | DIN ABRASION | mm³ | 122 | 117 | 167 | |
| | CUT DAMAGE | | VERY LOW | LOW | HIGH | |

FIG. 7A   PROBE A
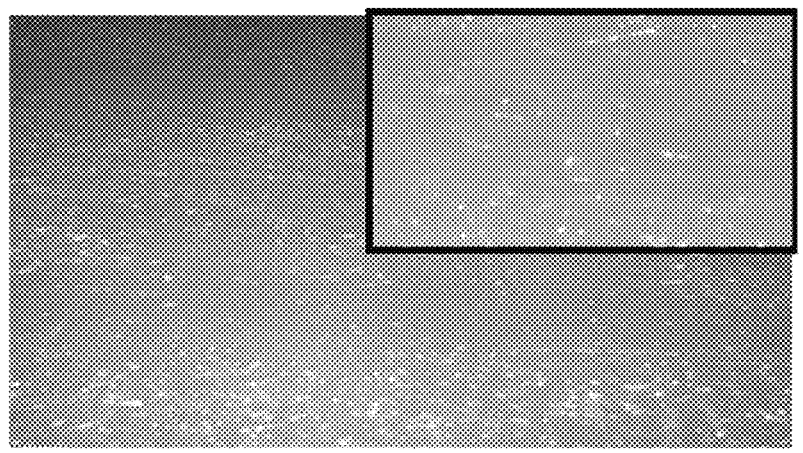
FIG. 7B   PROBE B
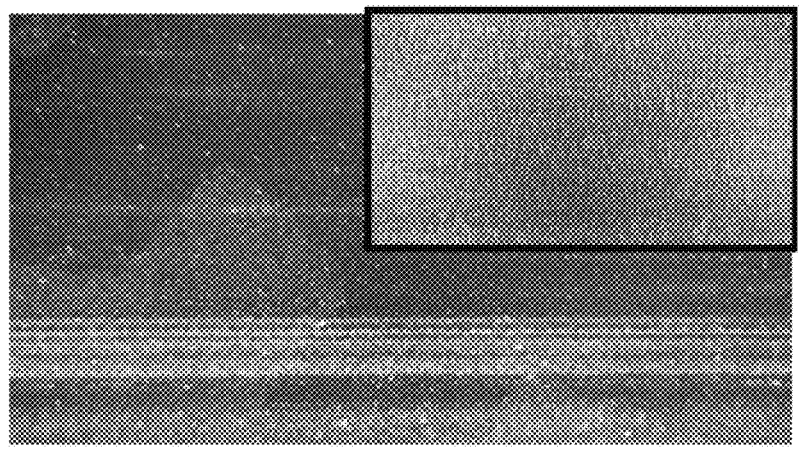
FIG. 7C   PROBE C
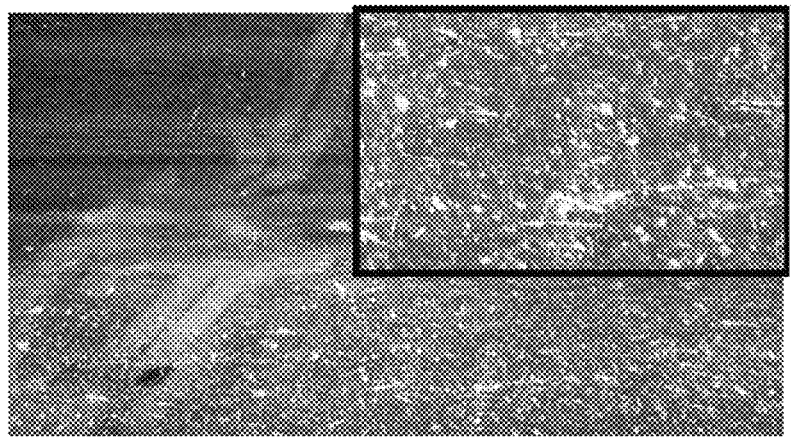

CONVEYOR BELT

TECHNICAL FIELD

The present invention relates to a conveyor belt including a belt core body covered with a cover rubber.

BACKGROUND ART

In the related art, mechanical strength indicators such as elongation at break Eb and tensile strength at break TSb are used as performance evaluation indicators for rubber members such as conveyor belts.

For example, when a conveyed article is loaded on a conveyor belt, the conveyed article may impact strongly against a cover rubber covering a core body, causing cut damage to the surface of the cover rubber. To reduce this cut damage, rubber with high mechanical strength (elongation at break Eb and tensile strength at break TSb) has been developed.

A known method of evaluating this type of rubber material includes a DIN abrasion test in which a test piece made of a rubber material is pressed against a cylindrical member with an abrasive cloth wound on the outer circumferential surface, the cylindrical member is rotated a predetermined number of times, and the wear amount of the test piece is measured.

Furthermore, a known technique for evaluating the durability of a rubber material for a conveyor belt, a method has been proposed in which the durability of a rubber material is evaluated on the basis of how much the weight of a test piece made from a rubber material for a conveyor belt was reduced by abrasive blasting the test piece for a predetermined period of time (see Patent Document 1 below). As described in Patent Document 1, a large impact force is applied to the surface of the test piece when the granular matter collides with the surface of the test piece, and the surface of the test piece is abraded by the impact force being applied multiple times. In other words, the test piece can be subjected to wear similar to the wear actually experienced by a conveyor belt, making it possible to reproduce the durability of an actual conveyor belt.

CITATION LIST

Patent Literature

Patent Document 1: JP 2008-224510 A

SUMMARY OF INVENTION

Technical Problem

There is a demand for the development of rubber member products such as conveyor belts that may be subjected to impacts during use to have high wear resistance and high shock resistance performance. Shock resistance performance depends on mechanical strength, as described above, as well as the energy absorbing properties of the rubber (hysteresis loss due to viscosity). However, quantitative evaluation of these are rare, and there is room for improvement.

For example, the loss tangent tan δ, which is an indicator of the viscoelastic characteristics of a rubber member, uses the value at room temperature and several tens of Hz from the perspective of simplifying measurement. However, the viscosity of the rubber member depends on speed, and thus the viscosity characteristics of a speed region (frequency region) according to the application should be evaluated. The development policy is preferably made on the basis of the evaluation results.

In light of the foregoing, an object of the present invention is to provide a conveyor belt with improved shock resistance performance.

Solution to Problem

To achieve the object described above, a conveyor belt according to aspect 1 of the invention comprises
a belt core body; and
a cover rubber covering the belt core body; wherein
the cover rubber is formed with a shock resistance performance evaluation index value, which is a product of an elongation at break Eb, a tensile strength at break TSb, and a loss tangent tan δ, of a predetermined value or greater; and
a measurement condition of the loss tangent tan δ is determined on the basis of a speed of an impact applied under a use condition of the conveyor belt.

In a conveyor belt according to aspect 2 of the invention, preferably the loss tangent tan δ is a ratio between a storage modulus and a loss modulus calculated from stress when vibrations of a predetermined frequency are applied to the cover rubber;
the measurement condition is the predetermined frequency; and
the predetermined frequency is determined by matching the speed of an impact applied under a use condition of the conveyor belt to a maximum speed of the vibrations.

In a conveyor belt according to aspect 3 of the invention, preferably
the shock resistance performance evaluation index value calculated using the loss tangent tan δ at the predetermined frequency of 10 kHz is 6000 or greater.

Advantageous Effects of Invention

According to aspect 1 of the invention, the conveyor belt is formed with a shock resistance performance evaluation index value, i.e., the product of an elongation at break Eb, a tensile strength at break TSb, and a loss tangent tan δ of a predetermined value or greater. As can be seen by unifying and comparing the index values that conventionally have been evaluated separately, the conveyor belt with improved shock resistance performance can be provided. Additionally, the measurement conditions of the loss tangent tan δ used in evaluating the shock resistance performance is determined on the basis of the speed of the impact applied under use conditions of the conveyor belt. Thus, the shock resistance performance can be evaluated using the value of the loss tangent tan δ corresponding to an impact actually applied to the conveyor belt, and it is possible to improve the accuracy of the shock resistance performance evaluation.

According to aspect 2 of the invention, the measurement frequency (a predetermined frequency) of the loss tangent tan δ is determined by matching the speed of the impact applied under the use conditions of the conveyor belt to the maximum velocity of the vibrations, thus the shock resistance performance can be evaluated by reflecting the viscosity of the cover rubber that changes depending on the speed of the impact.

According to the invention of aspect 3, it is possible to provide a conveyor belt having sufficient shock resistance performance in its intended use environment.

BRIEF DESCRIPTION OF DRAWINGS

FIGS. 1A and 1B are explanatory diagrams illustrating a configuration of a conveyor belt 10 according to an embodiment.

FIG. 2 is an explanatory diagram of a method of determined an evaluation frequency on the basis of a speed of an impact.

FIGS. 7A to 7C are surface photographs of conveyor belt cover rubber after use for a predetermined period of time.

DESCRIPTION OF EMBODIMENTS

Figure 3:
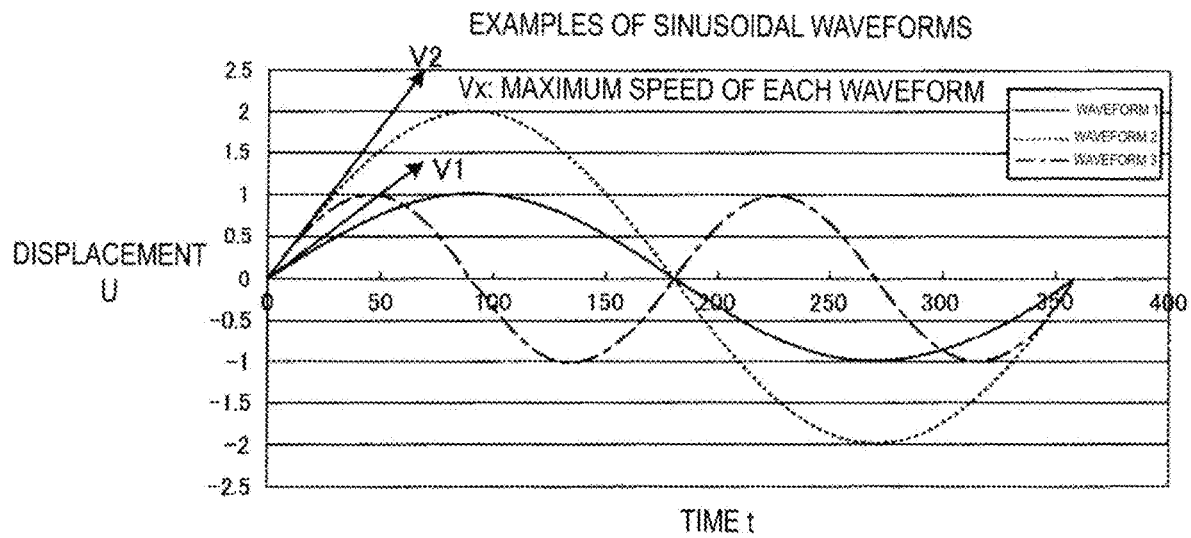
FIG. 3 is an explanatory diagram of a method of determined an evaluation frequency on the basis of a speed of an impact.

Conveyor belts according to preferred embodiments of the present invention are described in detail below with reference to the accompanying drawings.

FIGS. 1A and 1B are explanatory diagrams illustrating a configuration of a conveyor belt 10 according to an embodiment. FIG. 1A is a perspective view illustrating the use state of the conveyor belt 10, and FIG. 1B is a cross-sectional view along line A-A of the conveyor belt 10.

The conveyor belt 10 is used in a belt conveyance system 20 that includes a driving roller 22, a driven roller 24, and the conveyor belt 10 wound thereon.

The belt conveyance system 20 carries conveyed objects loaded on the conveyor belt 10 and moves the conveyor belt 10 in the direction of the arrow via the driving roller 22 and the driven roller 24 to move the conveyed objects.

As illustrated in FIG. 1B, the conveyor belt 10 includes a belt core body 14 including a plurality of canvas layered on one another and a cover rubber 12 that covers the belt core body 14. Various known materials can be used as the canvas constituting the belt core body 14, including organic fibers such as nylon fibers, polyester fibers, aramid fibers, and the like.

The cover rubber 12 can sustain cut damage or the like due to the impact of conveyed objects being loaded. Thus, improvement in shock resistance performance of the cover rubber 12 leads to improvement in the durability of the conveyor belt 10.

In the present embodiment, a shock resistance performance evaluation index (Eb×TSb×tan $\delta$), i.e., the product of an elongation at break Eb, a tensile strength at break TSb, and a loss tangent tan $\delta$ of the cover rubber 12, is set at a selected minimum value or greater, for example 6000 or greater.

In addition, the measurement conditions of the loss tangent tan $\delta$ used in calculating the shock resistance performance evaluation index are determined on the basis of the speed of the impact applied under the use conditions of the conveyor belt 10. In other words, the loss tangent tan $\delta$ of the cover rubber 12 is a ratio between the dynamic storage modulus and the dynamic loss modulus calculated from the stress when the cover rubber 12 is vibrated at a predetermined frequency. By matching the speed of the impact applied under the use conditions of the conveyor belt 10 to the maximum speed of the vibration, the frequency (evaluation frequency) of the loss tangent tan $\delta$ used in calculating the shock resistance performance evaluation index is determined.

Hereinafter, each parameter constituting the shock resistance performance evaluation index (Eb×TSb×tan $\delta$) will be described.

Elongation at Break Eb and Tensile Strength at Break TSb

First, the elongation at break Eb and the tensile strength at break TSb of the cover rubber 12 will be described.

The elongation at break Eb and the tensile strength at break TSb are measured via a method involving pulling a test piece of the cover rubber 12 to be subjected to performance evaluation. The elongation at break Eb is the elongation when the test piece fails by being pulled, and is indicated as the ratio (%) relative to an initial distance between reference lines. The tensile strength at break TSb is the tensile force recorded when the test piece fails by being pulled divided by an initial cross-sectional area of the test piece.

The detailed process of measuring the elongation at break Eb and the tensile strength at break TSb is determined by the process specified in JIS K6251: vulcanized rubber and thermoplastic rubber—tensile properties.

Loss Tangent Tan $\delta$

Next, the loss tangent tan $\delta$ of the cover rubber 12 will be described. The loss tangent tan $\delta$ is the ratio between the storage modulus and the loss modulus calculated from the stress when vibrations of a predetermined frequency are applied to the cover rubber 12, that is, a ratio of the loss modulus to the storage modulus in the dynamic viscoelasticity measurement. Higher values mean higher viscosity and the higher the performance of converting kinetic energy to heat. In addition, when the viscosity is high, the apparent hardness of the impact point increases, which has the effect of dispersing stress in the surroundings and reducing the amount by which the object falls into the rubber member.

Thus, a high loss tangent tan $\delta$ of the cover rubber 12 indicates high shock resistance performance.

The measurement of the loss tangent tan $\delta$ of the cover rubber 12 is generally performed with a dynamic viscoelasticity measurement device.

With a dynamic viscoelasticity measurement device, a sample of the cover rubber 12 is clamped in the measurement head, and stress is applied to the sample from the load-generating portion via a probe. This stress is applied as a sinusoidal force at a frequency set as one of the measurement conditions in a manner so that the strain amplitude of the sample is constant. The amount of deformation (distortion) of the sample produced by this sinusoidal force is detected by a displacement detection unit, and various types of viscoelastic quantities such as loss tangent tan $\delta$ are calculated from the stress applied to the sample and the detected distortion and output.

Figure 4:
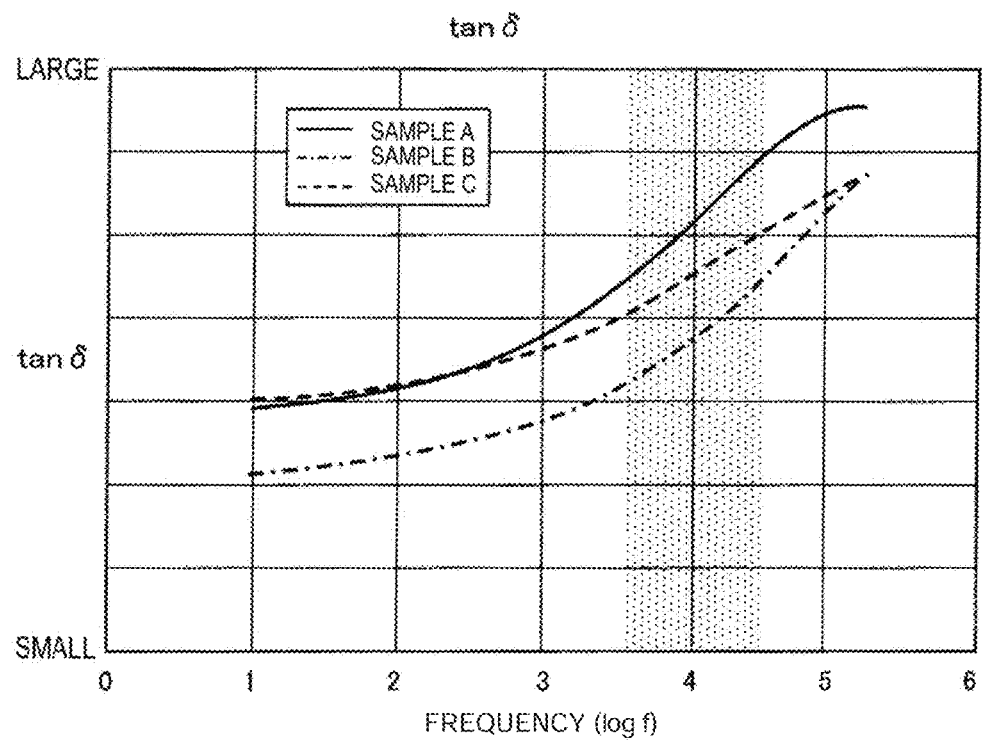
FIG. 4 is a graph showing a master curve of a loss tangent tan $\delta$.

When the temperature is constant, as illustrated in FIG. 4, a master curve is obtained with frequency on the x-axis and tan $\delta$ (alternately, storage modulus or loss modulus are also possible) on the y-axis.

FIG. 4 shows the loss tangent tan $\delta$ of three types of cover rubbers 12 (samples A to C).

Sample A is a shock resistance rubber example developed in-house. Sample B is a rubber-type H compliant product (JIS-H compliant) as specified in JIS K6369. Sample C is a rubber-type S compliant product (JIS-S compliant) as specified in JIS K6369.

The loss tangent tan δ of each cover rubber 12 increases from a low frequency band to a high frequency band as a whole, but the frequency characteristics differ from each other.

Note that the cover rubber thickness of the conveyor belt is typically from 5 mm to 25 mm. In this embodiment, a sample with a thickness of 10 mm was used. In addition, the temperature condition was set to 20° C.

Additionally, in practice, in a case in which a master curve having a frequency axis as illustrated in FIG. 4 is obtained, the measurement is performed by changing the temperature of the sample rather than changing the frequency of the vibrations. This is because the frequency characteristic curve indicating the relationship between the loss tangent tan δ and the frequency of the vibrations and a temperature characteristic curve indicating the relationship between the loss tangent tan δ and the environmental temperature at which measurement is performed can be converted to each other.

A known method of converting the frequency characteristic curve and the temperature characteristic curve can be used, thus the description thereof is omitted. However, a loss tangent tan δ at low temperatures corresponds to a loss tangent tan δ in a high frequency band, and a loss tangent tan δ at high temperatures corresponds to a loss tangent tan δ in a low frequency band.

Evaluation Frequency of Loss Tangent Tan δ

Next, the frequency (evaluation frequency) of the loss tangent tan δ used in the evaluation of shock resistance performance will be described.

As illustrated in FIG. 4, the value of the loss tangent tan δ is obtained as a frequency characteristic curve taken from the frequency on the horizontal axis. The value of the loss tangent tan δ used in the evaluation of shock resistance performance is determined from the master curve.

Specifically, the evaluation frequency, which is the frequency of the loss tangent tan δ used to evaluate the shock resistance performance, is determined by matching the speed of the impact applied under the use conditions of the cover rubber 12 with the maximum speed of the vibrations.

A method of determining the evaluation frequency on the basis of the speed of the impact will be described using FIGS. 2 and 3.

The impact applied under the use conditions of the cover rubber 12 is an impact when the conveyed article is loaded. In general, conveyed articles of a conveyor belt are dropped from a position higher than the conveyor belt surface (cover rubber surface) via a chute or the like, and loaded on the conveyor belt.

A drop speed Vf when the conveyed article lands on the conveyor belt is determined by a drop height H of the conveyed article. In other words, $V=\sqrt{2gH}$ (g: gravitational acceleration) is true.

FIG. 2 is a graph showing the relationship between the drop height H of the conveyed article and the drop speed Vf when the conveyor belt is reached. For example, in a case in which the conveyed article on the conveyor belt is ore or the like, the drop height H is high and is approximately 8 m. In this case, the drop speed Vf when the conveyed article reaches the conveyor belt is approximately 12.5 m/s.

In the case of the drop height H being relatively low at approximately 0.5 m, for example, the drop speed Vf when the conveyed article reaches the conveyor belt is approximately 3.1 m/s.

Next, the maximum speed of vibrations in the dynamic viscoelasticity measurement is considered to find the relationship between the drop rate Vf and the measurement conditions of the loss tangent tan δ.

As shown in FIG. 3, with a sine wave with an amplitude A and a frequency f (angular frequency $\omega=2\pi f$), a displacement $U=A \sin(\omega t)$ and a speed $V=A\omega \cos(\omega t)$.

A maximum speed Vx is obtained at cos 0°=1 and $Vx=A\omega=2\pi Af$.

When the drop speed Vf discussed above is substituted in for the maximum speed Vx, $f=Vf/2\pi A$.

When the amplitude A of the sine wave is 0.1 mm and the drop speed Vf described above equaling 3.1 m/s (dropped from a height of 0.5 m) to 12.5 m/s (dropped from a height of 8 m) is substituted in, the frequency f of the sine wave corresponds to from 5 kHz (dropped from a height of 0.5 m) to about 20 kHz (dropped from a height of 8 m). This region corresponds to the shaded portion (log f=approximately 3.7 to 4.3) of the graph of tan δ of FIG. 4. In this region, the tan δ of sample A is the highest, then sample C, then sample B.

To prevent damage to the cover rubber when articles are dropped (conveyed article) onto the cover rubber, the mechanical strength should be high at the point when the dropped article falls deepest into the cover rubber.

Here, since the dropped article has a speed of 0 in a drop direction, it is reasonable to use the elongation at break Eb and the tensile strength at break TSb measured in the laboratory as is as indicators of mechanical strength.

However, since the energy absorbing properties in the initial impact period are influenced by the initial speed at which the dropped article comes into contact with the cover rubber, it is reasonable to set the tan δ representing the viscosity of the cover rubber 12 in consideration of the speed of the impact applied under the use conditions of the cover rubber 12.

For example, when the cover rubber used in an environment in which the conveyed article is dropped from a height of 0.5 m, the evaluation frequency is preferably 4.9 kHz, and when the cover rubber used in an environment in which the conveyed article is dropped from a height of 8 m, the evaluation frequency is preferably 19.9 kHz. However, as described below, in the present embodiment, 10 kHz is used as a representative value of the evaluation frequency of the cover rubber requiring shock resistance performance.

Note that a master curve of the loss tangent tan δ such as that in FIG. 4 may not be measured, and instead, the loss tangent tan δ of the frequency may be measured in a pin point manner after the evaluation frequency is set.

Additionally, as described above, when the temperature characteristic curve is converted to a frequency characteristic curve, a temperature corresponding to the evaluation frequency may be calculated on the basis of the relationship between the curves, and the loss tangent tan δ may be calculated by measuring the stress when vibrations are applied to the cover rubber 12 at that temperature in a pin point manner.

Shock Resistance Performance Evaluation Index (Eb×TSb× tan δ)

As described above, the elongation at break Eb, the tensile strength at break TSb, and the loss tangent tan δ are used to evaluate the shock resistance performance of the cover rubber 12. Specifically, the shock resistance performance evaluation index (Eb×TSb×tan δ), i.e., the product of the elongation at break Eb, the tensile strength at break TSb, and the loss tangent tan δ of the cover rubber 12, is set at a selected minimum value or greater.

Here, in the present embodiment, the evaluation frequency of the cover rubber 12 when calculating the shock resistance performance evaluation index is defined as 10 kHz. This is because for a cover rubber with an evaluation frequency less than 10 kHz, that is a cover rubber with a low impact speed in the use environment, there is a low demand for shock resistance performance and the need for evaluation using a shock resistance performance evaluation index is also low. As illustrated in FIG. 4, the value of the loss tangent tan δ increases as the frequency increases. However, by using 10 kHz as a representative value of the evaluation frequency of the cover rubber requiring shock resistance, shock resistance performance can be easily and accurately evaluated.

In addition, in the present embodiment, the shock resistance performance is evaluated as high when the shock resistance performance evaluation index calculated using the loss tangent tan δ at the evaluation frequency of 10 kHz is 6000 or greater. In other words, the cover rubber 12 according to the present embodiment is formed with a shock resistance performance evaluation index calculated using the loss tangent tan δ at the evaluation frequency of 10 kHz of 6000 or greater.

Figures 5, 6:
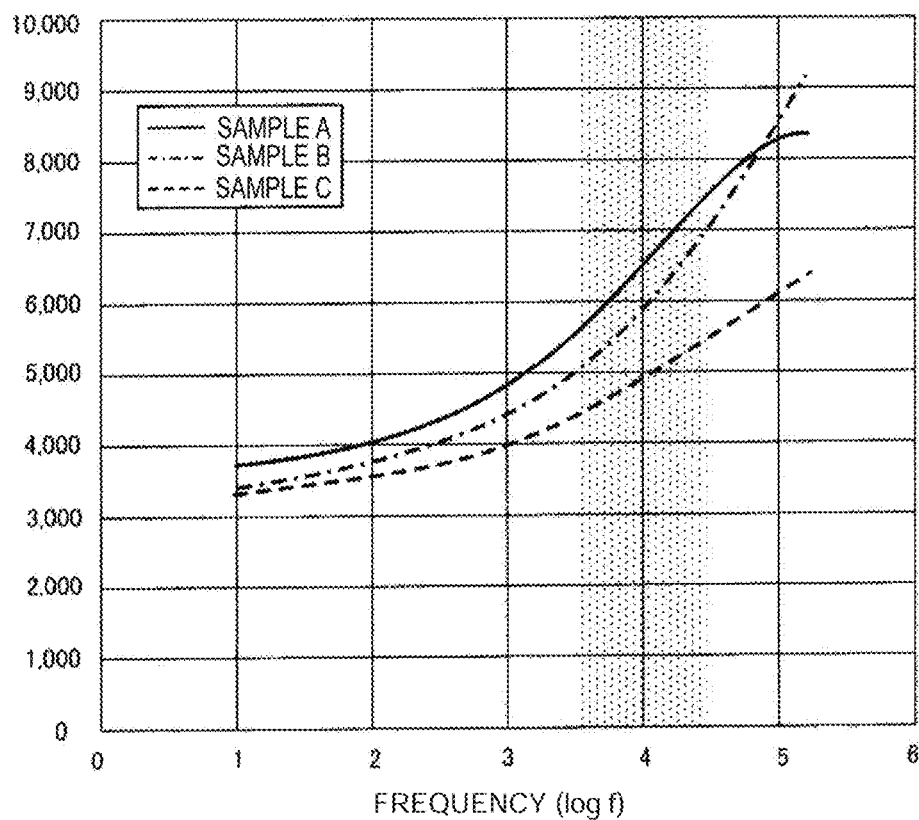
FIG. 5 is a graph showing the shock resistance performance evaluation index (Eb×TSb×tan $\delta$) of samples A to C.
FIG. 6 is a table listing performance evaluation values and performance evaluation test results of samples A to C.

FIG. 5 is a graph showing the shock resistance performance evaluation index (Eb×TSb×tan δ) of the samples A to C. FIG. 6 is a table listing the performance evaluation values and performance evaluation test results of the samples A to C. Note that each value listed in FIG. 6 is an average value of values measured of a plurality of samples of the same type.

In FIG. 5, the vertical axis is the shock resistance performance evaluation index (Eb×TSb×tan δ), and the horizontal axis is the frequency (logarithmic display).

As indicated in FIG. 6, the tensile strength at break TSb for the samples A, B, and C is 22.3, 28.2, and 20.9 respectively, the elongation at break Eb is 572, 562, and 530 respectively, and a break energy index, i.e., Eb×TSb, is 12761, 15848, and 11077 respectively. The tan δ at each frequency (see FIG. 4) was multiplied with Eb×TSb to produce the graph of FIG. 5.

As illustrated in FIGS. 5 and 6, the shock resistance performance evaluation index value (Eb×TSb×tan δ) of the samples A, B, and C at 10 kHz (log f=4) is 6543, 5901, 4944 respectively, and the sample A has a shock resistance performance evaluation index value (Eb×TSb×tan δ) of 6000 or higher.

The performance evaluation test was performed by a drop impact test, a DIN abrasion test, and surface observation of the conveyor belt cover rubber after use for a predetermined period of time.

The drop impact test was performed by dropping a needle from a predetermined height onto the surface of the sample and measuring how depth the needle entered. The results were found to be 17.2 mm and 19.9 mm for samples A and B respectively (the test was not performed on sample C), showing that sample A was more resistant to drop impact than sample B.

The DIN abrasion test was performed in accordance with the method specified in JIS K6264-2, with the result being 122, 117, and 167 for sample A, B, and C respectively. Accordingly, samples A and B had high and roughly equal DIN abrasion resistance, and the DIN abrasion resistance of sample C was lower than that of samples A and B.

FIGS. 7A to 7C are surface photographs of conveyor belt cover rubbers made of the same materials of samples A to C after use for a predetermined period. Sample A had very little cut damage on the surface of the cover rubber. Sample B had more cut damage than sample A but had relatively little cut damage. In contrast, sample C had a high amount of cut damage.

From these results, it can be seen that the shock resistance performance evaluation index (Eb×TSb×tan δ) using the elongation at break Eb, the tensile strength at break TSb, and the loss tangent tan δ reflects the shock resistance performance of the actual rubber member with high accuracy.

As described above, the conveyor belt 10 according to an embodiment is formed with a shock resistance performance evaluation index value, i.e., the product of an elongation at break Eb, a tensile strength at break TSb, and a loss tangent tan δ of the cover rubber 12, of a selected minimum value or greater. As can be seen by unifying and comparing the index values that conventionally have been evaluated separately, the conveyor belt 10 with improved shock resistance performance can be provided.

Additionally, the measurement conditions of the loss tangent tan δ used in evaluating the shock resistance performance is determined on the basis of the speed of the impact applied under use conditions of the conveyor belt 10. Thus, the shock resistance performance can be evaluated using the value of the loss tangent tan δ corresponding to an impact actually applied to the conveyor belt 10, and it is possible to improve the accuracy of the shock resistance performance evaluation.

Furthermore, the measurement frequency (a predetermined frequency) of the loss tangent tan δ is determined by matching the speed of the impact applied under the use conditions of the conveyor belt 10 to the maximum velocity of the vibrations, thus the shock resistance performance can be evaluated by reflecting the viscosity of the cover rubber 12 that changes depending on the speed of the impact.

Also, by forming the cover rubber 12 so that the shock resistance performance evaluation index value calculated using 10 kHz as the evaluation frequency of the loss tangent tan δ is 6000 or greater, it is possible to provide the conveyor belt 10 having sufficient shock resistance performance in the intended use environment.

REFERENCE SIGNS LIST

10 Conveyor belt
12 Cover rubber
14 Belt core body
20 Belt conveyance system
22 Driving roller
24 Driven roller

The invention claimed is:

1. A conveyor belt, comprising:
a belt core body; and
a cover rubber covering the belt core body;
the cover rubber being formed with a shock resistance performance evaluation index value, which is a product of an elongation at break Eb, a tensile strength at break TSb, and a loss tangent tan δ, which is a ratio between a storage modulus and a loss modulus calculated from stress when vibrations of a selected frequency are applied to the cover rubber, the shock resistance performance evaluation index value being equal to or greater than a selected minimum value;
wherein a measurement condition of the loss tangent tan δ is determined on a basis of a speed of an impact applied under a use condition of the conveyor belt.

2. The conveyor belt according to claim 1, wherein
the measurement condition is the selected frequency; and
the selected frequency is determined by matching the speed of an impact applied under a use condition of the conveyor belt to a maximum speed of the vibrations.

3. The conveyor belt according to claim 1, wherein the shock resistance performance evaluation index value calculated using the loss tangent tan δ at a frequency of 10 kHz is 6000 or greater.

4. The conveyor belt according to claim 2, wherein the shock resistance performance evaluation index value calculated using the loss tangent tan δ at a frequency of 10 kHz is 6000 or greater.

* * * * *